__(12)__ United States Patent
Benyamin et al.

(10) Patent No.: US 9,002,892 B2
(45) Date of Patent: Apr. 7, 2015

(54) SYSTEMS AND METHODS FOR TREND DETECTION USING FREQUENCY ANALYSIS

(75) Inventors: Daniel Benyamin, Los Angeles, CA (US); Aaron Chu, Los Angeles, CA (US)

(73) Assignee: CitizenNet, Inc., Culver City, CA (US)

( * ) Notice: Subject to any disclaimer, the term of this patent is extended or adjusted under 35 U.S.C. 154(b) by 278 days.

(21) Appl. No.: 13/568,851

(22) Filed: Aug. 7, 2012

(65) Prior Publication Data

US 2013/0036107 A1  Feb. 7, 2013

Related U.S. Application Data

(60) Provisional application No. 61/515,951, filed on Aug. 7, 2011.

(51) Int. Cl.
    *G06F 17/30* (2006.01)
(52) U.S. Cl.
    CPC ............... *G06F 17/30613* (2013.01)
(58) Field of Classification Search
    CPC .......................................................... G06F 17/30
    USPC ................................................. 707/600–899
    See application file for complete search history.

(56) References Cited

U.S. PATENT DOCUMENTS

| | | | |
|---|---|---|---|
| 5,465,309 A | 11/1995 | Johnson | |
| 5,835,087 A | 11/1998 | Herz et al. | |
| 5,999,902 A | 12/1999 | Scahill et al. | |
| 6,515,681 B1 | 2/2003 | Knight | |
| 6,571,225 B1 | 5/2003 | Oles et al. | |
| 6,571,234 B1 | 5/2003 | Knight et al. | |
| 6,766,349 B1 | 7/2004 | Belkin | |
| 7,080,139 B1 | 7/2006 | Briggs et al. | |
| 7,089,226 B1 | 8/2006 | Dumais et al. | |
| 7,421,395 B1 | 9/2008 | Link et al. | |
| 7,603,349 B1 | 10/2009 | Kraft et al. | |
| 7,657,515 B1 | 2/2010 | Jewell | |
| 7,734,627 B1 | 6/2010 | Tong | |
| 7,743,051 B1 | 6/2010 | Kashyap et al. | |
| 7,860,928 B1 | 12/2010 | Anderson | |
| 7,917,528 B1 | 3/2011 | Dave et al. | |
| 7,925,496 B1 | 4/2011 | Rubin | |
| 7,933,818 B1 | 4/2011 | Kumar et al. | |
| 7,941,437 B2 | 5/2011 | Cooley | |

(Continued)

OTHER PUBLICATIONS

Press, et al., "Numerical Recipes in FORTRAN 77", vol. 1 of Fortran Numerical Recipes: The Art of Scientific Computing, Cambridge University Press, 1992, 5 pgs.

(Continued)

*Primary Examiner* — Isaac M Woo
(74) *Attorney, Agent, or Firm* — KPPB LLP (57) ABSTRACT

Systems and methods for trend detection using frequency analysis in accordance with embodiments of the invention are disclosed. In one embodiment of the invention, trend detection includes generating a discrete time sequence of word counts for a target word using a trend detection device, performing frequency analysis of the discrete time sequence of word counts to determine contributions of frequency components within different frequency ranges to the discrete time sequence of word counts using the trend detection device, and detecting that the target word is a trending keyword based upon at least the frequency analysis of the discrete time sequence of word counts for the target word using the trend detection device.

19 Claims, 6 Drawing Sheets

(56) References Cited

U.S. PATENT DOCUMENTS

| | | |
|---|---|---|
| 8,086,631 B2 | 12/2011 | Gollapudi et al. |
| 8,301,616 B2 | 10/2012 | Guha et al. |
| 8,380,697 B2 | 2/2013 | Benyamin et al. |
| 8,504,550 B2 | 8/2013 | Hall et al. |
| 8,554,854 B2 | 10/2013 | Benyamin et al. |
| 2002/0016787 A1 | 2/2002 | Kanno |
| 2002/0062368 A1 | 5/2002 | Holtzman et al. |
| 2002/0123928 A1 | 9/2002 | Eldering et al. |
| 2003/0028595 A1 | 2/2003 | Vogt et al. |
| 2003/0164855 A1 | 9/2003 | Grant et al. |
| 2003/0212673 A1 | 11/2003 | Kadayam et al. |
| 2005/0080613 A1 | 4/2005 | Colledge et al. |
| 2005/0080856 A1 | 4/2005 | Kirsch |
| 2005/0204002 A1 | 9/2005 | Friend |
| 2006/0069589 A1 | 3/2006 | Nigam et al. |
| 2006/0242128 A1 | 10/2006 | Goel |
| 2006/0253437 A1 | 11/2006 | Fain et al. |
| 2006/0282328 A1 | 12/2006 | Gerace et al. |
| 2007/0033104 A1 | 2/2007 | Collins et al. |
| 2007/0061195 A1 | 3/2007 | Liu et al. |
| 2007/0106500 A1 | 5/2007 | Loofbourrow et al. |
| 2007/0124432 A1 | 5/2007 | Holtzman et al. |
| 2007/0260580 A1 | 11/2007 | Omoigui |
| 2007/0288433 A1 | 12/2007 | Gupta et al. |
| 2008/0021884 A1 | 1/2008 | Jones et al. |
| 2008/0059488 A1 | 3/2008 | Iyengar et al. |
| 2008/0091670 A1 | 4/2008 | Ismalon |
| 2008/0140502 A1 | 6/2008 | Birnholz et al. |
| 2008/0172368 A1 | 7/2008 | Chowdhury et al. |
| 2008/0222142 A1 | 9/2008 | O'donnell |
| 2008/0243842 A1 | 10/2008 | Liang et al. |
| 2008/0294624 A1 | 11/2008 | Kanigsberg et al. |
| 2008/0313215 A1 | 12/2008 | Beker et al. |
| 2009/0049029 A1 | 2/2009 | Choi et al. |
| 2009/0049127 A1 | 2/2009 | Juan et al. |
| 2009/0063469 A1 | 3/2009 | Gross |
| 2009/0070219 A1 | 3/2009 | D'angelo et al. |
| 2009/0070346 A1 | 3/2009 | Savona et al. |
| 2009/0100042 A1 | 4/2009 | Qiao |
| 2009/0109872 A1 | 4/2009 | Skubacz et al. |
| 2009/0119167 A1 | 5/2009 | Kendall et al. |
| 2009/0119261 A1 | 5/2009 | Ismalon |
| 2009/0164464 A1 | 6/2009 | Carrico et al. |
| 2009/0171686 A1 | 7/2009 | Eberstadt |
| 2009/0177754 A1 | 7/2009 | Brezina et al. |
| 2009/0216696 A1 | 8/2009 | Downs et al. |
| 2009/0234815 A1 | 9/2009 | Boerries et al. |
| 2009/0276285 A1 | 11/2009 | Nomula |
| 2010/0049534 A1 | 2/2010 | Whitnah et al. |
| 2010/0169327 A1 | 7/2010 | Lindsay et al. |
| 2010/0223279 A1 | 9/2010 | Scott |
| 2010/0268628 A1 | 10/2010 | Pitkow et al. |
| 2010/0293170 A1 | 11/2010 | Hall et al. |
| 2010/0306249 A1 | 12/2010 | Hill et al. |
| 2011/0060794 A1 | 3/2011 | Sweeney |
| 2011/0078130 A1 | 3/2011 | Roizen et al. |
| 2011/0093336 A1 | 4/2011 | Calabria |
| 2011/0093455 A1 | 4/2011 | Benyamin et al. |
| 2011/0145348 A1 | 6/2011 | Benyamin et al. |
| 2011/0170777 A1* | 7/2011 | Inagaki .......................... 382/177 |
| 2011/0231240 A1 | 9/2011 | Schoen et al. |
| 2012/0004959 A1 | 1/2012 | Benyamin et al. |
| 2012/0158489 A1 | 6/2012 | Benyamin et al. |
| 2012/0158518 A1 | 6/2012 | Benyamin et al. |
| 2012/0259619 A1 | 10/2012 | Hall |
| 2012/0323674 A1 | 12/2012 | Simmons et al. |
| 2012/0323905 A1 | 12/2012 | Qiao |
| 2013/0179426 A1 | 7/2013 | Benyamin et al. |
| 2013/0218678 A1 | 8/2013 | Benyamin et al. |
| 2013/0232154 A1 | 9/2013 | Hall et al. |
| 2013/0290091 A1 | 10/2013 | Benyamin |
| 2014/0244400 A1 | 8/2014 | Benyamin et al. |

OTHER PUBLICATIONS

Acar et al., "Modeling and Multiway Analysis of Chatroom Tensors", ISI'05 Proceedings of the 2005 IEEE international conference on Intelligence and Security Informatics, 13 pgs.

Gamon, "Sentiment classification on customer feedback data: noisy data, large feature vectors, and the role of linguistic analysis", Proceedings of the 20th international conference on Computational Linguistics, Association for Computational Linguistics, 2004, 7 pgs.

Garg et al., "Understanding Probabilistic Classifiers", Machine Learning: ECML 2001, 2001, 179-191.

Hein, "How Search Really Works: The Keyword Density Myth", Search Engine People, found on line at www.searchenginepeople.com/blog/how-search-really-works-the-keyword-density-myth.html, Feb. 1, 2008, 3 pgs.

Liu et al., "Personalized Web Search for Improving Retrieval Effectiveness", IEEE Transactions on Knowledge and Data Engineering, vol. 16, No. 1, Jan. 2004, 35 pgs.

Pearlman, "Facebook Ads", The Facebook Blog, found on line at blog.facebook.com/blog.php?post=6972252130, Nov. 6, 2007, 2 pgs.

"Automatic Expansion of Domain-Specific Lexicons by Term Categorization", ACM Transactions on Speech and Language Processing, vol. 3, No. 1, May 2006, pp. 1-30.

Ambekar et al., "Name-Ethnicity Classification from Open Sources", KDD '09, Jun. 28-Jul. 1, 2009, 9 pgs.

Androutsopoulos et al., "An Evaluation of Naive Bayesian Anti-Spam Filtering", Proceedings of the workshop on machine Learning in the New Information Age, 2000, pp. 9-17.

Argamon et al., "Gender, Genre and Writing Style in Formal Written Texts", Source and date unknown, 32 pgs.

Backstrom et al., "Find Me if You Can: Improving Geographical Prediction with Social and Spatial Proximity", WWW, 2010, 10 pgs.

Backstrom et al., "Network Bucket Testing", Source and date unknown, 10 pgs.

Bakshy et al., "Everyone's an Influencer: Quantifying Influence on Twitter", WSDM '11, Feb. 9-12, 2011, 10 pgs.

Bakshy et al., "The Role of Social Networks in Information Diffusion", Source and date unknown, 9 pgs.

Bernstein et al., "Eddi: Interactive Topic-based Browsing of Social Status Streams", UIST, 2010, 10 pgs.

Berwick, "An Idiot's Guide to Support Vector Machines (SVMs)", Source and date unknown, 25 pgs.

Blei et al., "Latent Dirichlet Allocation", Source and date unknown, 8 pgs.

Bollen et al., "Modeling public mood and emotion: Twitter sentiment and socioeconomic phenomena", WWW, Apr. 2010, 10 pgs.

Burke et al., "Feed Me: Motivating Newcomer Contribution in Social Network Sites", CHI 2009, Apr. 4-9, 2009, 10 pgs.

Burke et al., "Social Capital on Facebook: Differentiating Uses and Users", CHI, 2011, 10 pgs.

Burke et al., "Social Network Activity and Social Well-Being", CHI 2010, 4 pgs.

Cer et al., "Parsing to Stanford Dependencies: Trade-offs between speed and accuracy", Source and date unknown, 5 pgs.

Chang, "Not-So-Latent Dirichlet Allocation: Collapsed Gibbs Sampling Using Human Judgments", Proceedings of the NAACL HLT 2010 Workshop on Creating Speech and Language Data with Amazon's Mechanical Turk, pp. 131-138.

Chang et al., "ePluribus: Ethnicity on Social Networks", Association for the Advancement of Artificial Intelligence, 2010, 8 pgs.

Ghosh et al., "Community Detection Using a Measure of Global Influence", 2nd SNA-KDD Workshop, 2008, 9 pgs.

Ghosh et al., "Structure of Heterogeneous Networks", Source unknown, Jun. 11, 2009, 8 pgs.

Go et al., "Twitter Sentiment Analysis", CS224N—Final Project Report, Jun. 6, 2009, 17 pgs.

Go et al., "Twitter Sentiment Classification Using Distant Supervision", Source and date unknown, 6 pgs.

Hearst, "Trends & Controversies—Support Vector Machines", IEEE Intelligent Systems, Jul./Aug. 1998, pp. 18-28.

Joachims, "Text Categorization with Support Vector Machines: Learning with Many Relevant Features", Universitat Dortmund Fachbereich Informatik, Nov. 1997, 18 pgs.

(56) References Cited

OTHER PUBLICATIONS

Kim et al., "Literary Style Classification with Deep Linguistic Analysis Features", Source and date unknown, 7 pgs.
Kintsch, "Predication", Source and date unknown, 40 pgs.
Kintsch, "The Role of Knowledge in Discourse Comprehension: A Construction-Integration Model", Psychological Review, 1988, vol. 95, No. 2, pp. 163-182.
Kramer, "An Unobtrusive Behavioral Model of "Gross National Happiness"", CHI 2010: Language 2.0, Apr. 10-15, 2010, pp. 287-290.
Lerman, "Semantic Labeling of Online Information Sources", Source and date unknown, 19 pgs.
Li et al., "Keyword Extraction for Social Snippets", WWW 2010, Apr. 26-30, 2010, 2 pgs.
Lu et al., "Opinion Integration Through Semi-supervised Topic Modeling", WWW 2008, Refereed Track: Data Mining—Modeling, Apr. 21-25, 2008, pp. 121-130.
Meyer, "Support Vector Machines", Source unknown; Sep. 12, 2011, pp. 1-8.
Mishne, "Experiments with Mood Classification in Blog Posts", Style 2005, 8 pgs.
Pang et al., "Opinion Mining and Sentiment Analysis", Foundations and Trends in Information Retrieval, 2008, vol. 2, Nos. 1-2, pp. 1-135.
Ratkiewicz et al., "Detecting and Tracking the Spread of Astroturf Memes in Microblog Streams", Source unknown, Nov. 2010, 10 pgs.
Scott et al., "Text Classification Using WordNet Hypernyms", Source and date unknown, pp. 45-51.
Sun et al., "Gesundheit! Modeling Contagion through Facebook News Feed", Association for the Advancement of Artificial Intelligence, 2009, 8 pgs.
Tyler et al., "Retrieval Models for Audience Selection in Display Advertising", CIKM 2011, 6 pgs.
Wallach, "Topic Modeling: Beyond Bag-of-Words", Source unknown, Jun. 26, 2006, 40 pgs.
Wilson et al., "Term Weighting Schemes for Latent Dirichlet Allocation", Human Language Technologies: The 2010 Annual Conference of the North American Chapter of the ACL, pp. 465-473.
Zheng et al., "A Framework for Authorship Identification of Online Messages: Writing-Style Features and Classification Techniques", Journal of the American Society for Information Science and Technology, 2006, vol. 57, No. 3, pp. 378-393.

* cited by examiner

SYSTEMS AND METHODS FOR TREND DETECTION USING FREQUENCY ANALYSIS

CROSS-REFERENCE TO RELATED APPLICATIONS

This application claims the benefit of U.S. Provisional Patent Application No. 61/515,951, filed on Aug. 7, 2011, the disclosure of which is hereby incorporated by reference in its entirety.

FIELD OF THE INVENTION

The present invention generally relates to detecting trends and more specifically to detecting trends in a stream of words using frequency analysis.

BACKGROUND

The Internet is an influential mechanism for disseminating information. News sites, from global in scale to local, are popular destinations for people surfing the Internet. With the advent of blogs, forums, and social networking sites, including the Facebook service provided by Facebook, Inc. of Menlo Park, Calif. and the Twitter service provided by Twitter, Inc. of San Francisco, Calif., news and information is being created by both professional news outlets and from ordinary people, leading to an exponential growth in the amount of news and information available on the Internet.

The Fourier transform is a mathematical transform that expresses a mathematical function of time as a function of frequency. The term Fourier transform is commonly used to refer to both the transform operation and to the complex-valued function it produces. A discrete Fourier transform (DFT) is a discrete transformation of one function (the input function) into the frequency domain representation of the input function.

SUMMARY OF THE INVENTION

Systems and methods for trend detection using frequency analysis in accordance with embodiments of the invention are disclosed. In one embodiment of the invention, trend detection includes generating a discrete time sequence of word counts for a target word using a trend detection device, performing frequency analysis of the discrete time sequence of word counts to determine contributions of frequency components within different frequency ranges to the discrete time sequence of word counts using the trend detection device, and detecting that the target word is a trending keyword based upon at least the frequency analysis of the discrete time sequence of word counts for the target word using the trend detection device.

In another embodiment of the invention, trend detection includes performing frequency analysis including applying a discrete Fourier transform to the discrete time sequence of word counts, and the different frequency ranges comprise a low frequency range, a medium frequency range, and a high frequency range.

In an additional embodiment of the invention, performing frequency analysis further includes comparing the contributions of frequency components in the high frequency range of the discrete time sequence of word counts to the contributions of frequency components in the low frequency range of the discrete time sequence of word counts.

In yet another additional embodiment of the invention, comparing the contributions of frequency components in the high frequency range of the discrete time sequence of word counts to the contributions of frequency components in the low frequency range of the discrete time sequence of word counts includes comparing the ratio of energy of the frequency components in the high frequency and low frequency ranges to a first threshold value.

In still another additional embodiment of the invention, the first threshold is determined based upon a ratio of energy determined using a discrete time sequence of word counts for normal usage of the target word.

In yet still another additional embodiment of the invention, the first threshold is adjusted using a human training feedback loop.

In yet another embodiment of the invention, performing frequency analysis further includes comparing the contributions of frequency components in the middle frequency range of the discrete time sequence of word counts to the contributions of frequency components in the low frequency range of the discrete time sequence of word counts.

In still another embodiment of the invention, performing frequency analysis further comprises comparing the contributions of frequency components in the middle frequency range of the discrete time sequence of word counts to the contributions of frequency components in the low frequency range of the discrete time sequence of word counts further includes comparing the ratio of energy of the frequency components in the medium and low frequency ranges to a second threshold value.

In yet still another embodiment of the invention, trend detection further includes receiving a set of words including a plurality of occurrences of the target word using the trend detection device.

In yet another additional embodiment of the invention, the set of words is a stream of words.

In still another additional embodiment of the invention, trend detection further includes assigning a time stamp to at least one occurrence of target word in the set of words using the trend detection device.

In yet still another additional embodiment of the invention, trend detection further includes discarding stop words from the set of words using the trend detection device.

In yet another embodiment of the invention, trend detection further includes storing the set of words in a database, where the database associates metadata including a time with each occurrence of the target word.

In still another embodiment of the invention, generating a discrete time sequence of word counts for the target word using a trend detection device comprises using the time associated with each occurrence of the target word to determine the number of occurrences of the target word during discrete time intervals.

In yet still another embodiment of the invention, trend detection further includes detecting a trending phrase including the target word using the trend detection device, when the trend detection device detects that the target word is a trending keyword.

In yet another additional embodiment of the invention, detecting trending phrases further comprises clustering the target keyword with at least one additional trending keyword using the trend detection device.

In still another additional embodiment of the invention, trend detection further includes receiving a set of words including a plurality of occurrences of the target word using the trend detection device, where the set of words includes groups of words and at least one group of words includes the target word, wherein detecting a trending phrase further comprises adding at least one additional word to the target word to create a target phrase, where the at least one additional word is in a group of words that includes the target word.

In yet still another additional embodiment of the invention, performing frequency analysis includes generating a 3-dimensional spectrogram using the discrete time sequence of word counts.

In yet still another additional embodiment of the invention, trend detection further includes targeting advertising based on at least one keyword including at least the target word using an advertising targeting server system, when the trend detection device detects that the target word is a trending keyword.

Yet another embodiment of the invention includes a trend detection device, including word data storage configured to store a stream of words, application storage configured to store a trend detection application, and a processor, wherein the trend detection application configures the processor to generate a discrete time sequence of word counts for a target word, perform frequency analysis of a discrete time sequence of word counts to determine contributions of frequency components within different frequency ranges to the discrete time sequence of word counts, and detect that a target word is a trending keyword based upon at least the frequency analysis of a discrete time sequence of word counts for the target word.

In yet another additional embodiment of the invention, the trend detection application further configures the processor to perform frequency analysis by applying a discrete Fourier transform to a discrete time sequence of word counts and the different frequency ranges comprise a low frequency range, a middle frequency range, and a high frequency range.

In still another additional embodiment of the invention, the trend detection application further configures the processor to detect a trending phrase including a target word.

DETAILED DESCRIPTION OF THE INVENTION

Turning now to the drawings, systems and methods for trend detection using frequency analysis in accordance with embodiments of the invention are illustrated. A large amount of news and other information, such as tweets and posts on Facebook, is available on the Internet. With the large amount of news and information available, it can be important to not only to measure the rise and fall in the conversation around a trend, but to detect new trends. A low latency in detecting new trends can be beneficial in detecting 'breaking' news stories or other information.

Trend detection systems in accordance with embodiments of the invention create time varying signals using a stream of words taken from word sources. Word sources include, but are not limited to, news stories, messages on social networking services, and other available information. A stream of words often contains groups of words, such as sentences and/or sentence fragments, taken from the word sources. By generating signals in the frequency domain using the time varying signals and/or the stream of words, the frequency spectrum of time varying signals can be analyzed to detect trends indicated by the frequency spectrum of specific words in the stream of words. The analysis of a stream of words includes, but is not limited to, determining normal word usage, words used in new trends, and words used in recurring trends. In many embodiments, a trend detection system breaks the frequency spectrum of a signal into a low frequency range, a medium frequency range, and a high frequency range; and analyzes words by comparing the amount of energy present in the signal in each frequency range. Trends can be detected by looking at the change in the energy present in the different frequency ranges over time. The words that appear in trends can be referred to as trending keywords. Signals for trending keywords may also be analyzed to detect trends which describe the same topic using varying terms and to detect independent but related trends.

Once trends involving trending keywords have been detected, the trending keywords in the trends may be utilized in a variety of systems. In several embodiments, the keywords may be utilized in advertising campaigns. Systems and methods for generating advertising campaigns using advertising targeting information are disclosed in U.S. patent application Ser. No. 13/331,950, entitled "Systems and Methods for Automatically Generating Campaigns using Advertising Targeting Information based upon Affinity Information Obtained from an Online Social Network" to Benyamin et al., the entirety of which is incorporated by reference.

Systems and methods for trend detection using frequency analysis of streams of words in accordance with embodiments of the invention are discussed further below.

Trend Detection Systems

Figure 1:
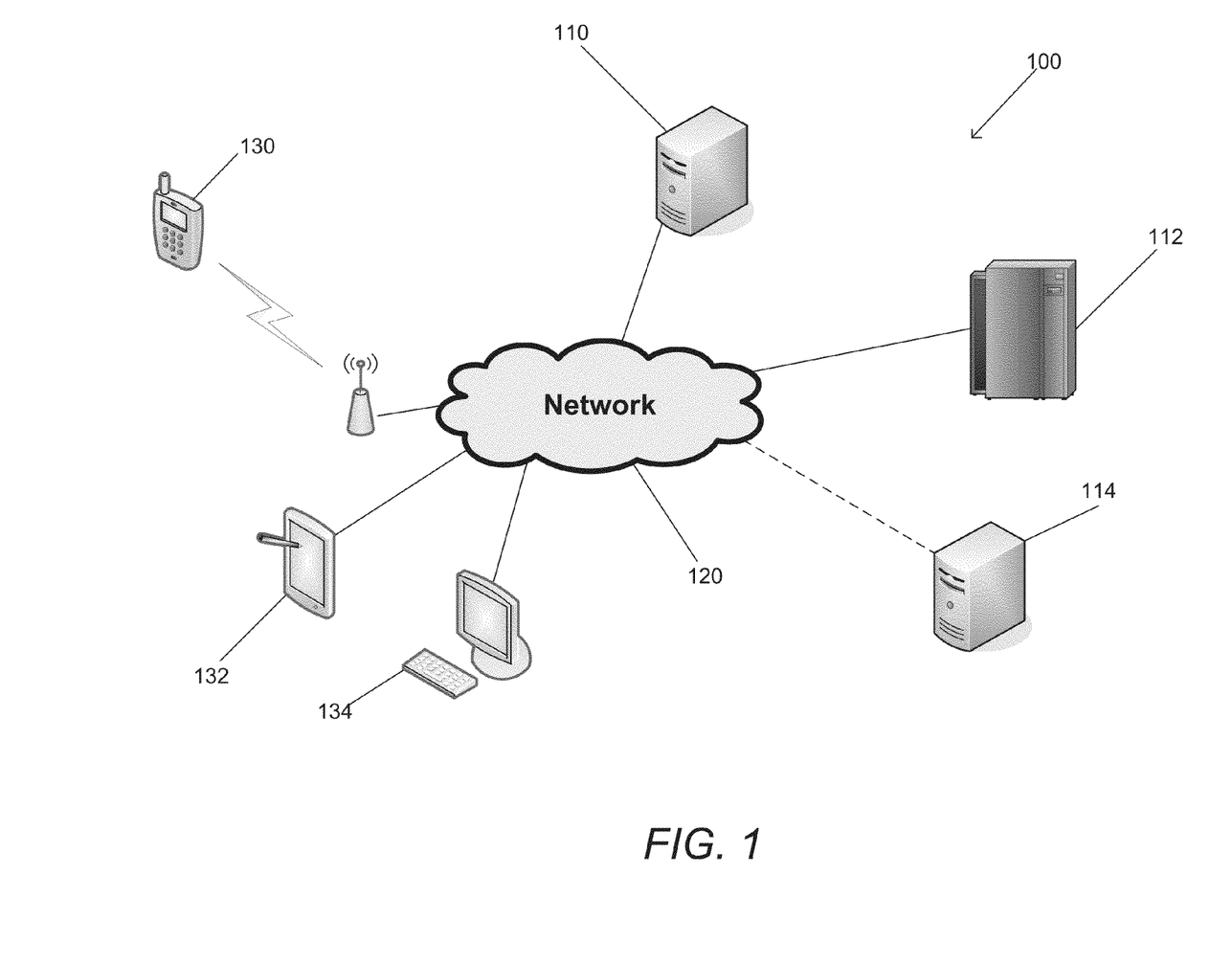
FIG. 1 is a network diagram showing a trend detection system in accordance with an embodiment of the invention.

A trend detection system in accordance with an embodiment of the invention is illustrated in FIG. 1. The trend detection system 100 includes at least one information server system 110 configured to receive news, social networking updates, and other information from a plurality of sources, which are in communication with the information server system 110 via a network 120. These sources include, but are not limited to, cellular telephones 130, tablets 132, and personal computers 134. In many embodiments, the network 120 is the Internet. In several embodiments, the information server system 110 includes a plurality of sources of information distributed across a plurality of servers. In a number of embodiments, the information server system 110 is configured to aggregate information published across a plurality of sources of information.

The trend detection system 100 includes a trend detection device 112 configured to receive one or more streams of words from at least one information server system 110. Streams of words include, but are not limited to, news stories, tweets, posts on social networking sites, and blog entries. The words contained in the streams of words are organized as individual words, sentences, sentence fragments, and/or other groupings of words. In many embodiments, the words contained in the stream of words have metadata associated with the words; this metadata includes, but is not limited to, a timestamp of when the words were created, published, and/or received by the trend detection device 112. The trend detection device 112 is configured to determine one or more signals using words contained in the received streams of words. In many embodiments, the trend detection device generates discrete time signal representing counts of the number of occurrences of the word during discrete time intervals. In several embodiments, a signal is also generated in the frequency domain. In a number of embodiments, the signal represents frequency components of the discrete time signal. The trend detection device is further configured to determine trending keywords indicative of trends, including new trends and/or recurring trends, using frequency analysis of the number of occurrences of specific keywords during discrete time intervals. The trend detection device 112 utilizes the determined trends and the one or more signals to detect trending phrases containing words appearing near the trending keywords. Additionally, the trend detection device 112 is configured to identify relationships between trends using the one or more signals. In a number of embodiments, the trend detection device 112 is configured to determine trends surrounding a received keyword or keywords. In many embodiments, the trend detection device 112 and the information server system 110 are a single sever. In several embodiments, the trend detection device 112 and the information server system 110 are separate servers communicating via the network 120.

In accordance with embodiments of the invention, the trend detection system 110 includes at least one advertising targeting server system 114. The advertising targeting server system 114 is configured to generate a listing of targeting keywords that will optimally target an offer to members of the online social network based upon the affinity information and an advertising strategy. The advertising targeting server system 114 is configured to utilize the trending keywords received from the trend detection device in determining the listing of targeting keywords. In several embodiments, at least one advertising targeting server system 114 is configured to communicate with the information server system 110 and/or the trend detection device 112 using the network 120. In a number of embodiments, the information server system 110, the trend detection device 112, and/or the advertising targeting server system 114 are implemented using a single server or a cluster of servers.

A trend detection system in accordance with an embodiment of the invention is described above; however, a variety of trend detection systems may be utilized in accordance with embodiments of the invention. Systems and methods for trend detection using frequency analysis are discussed below.

Trend Detection Devices

Figure 2:
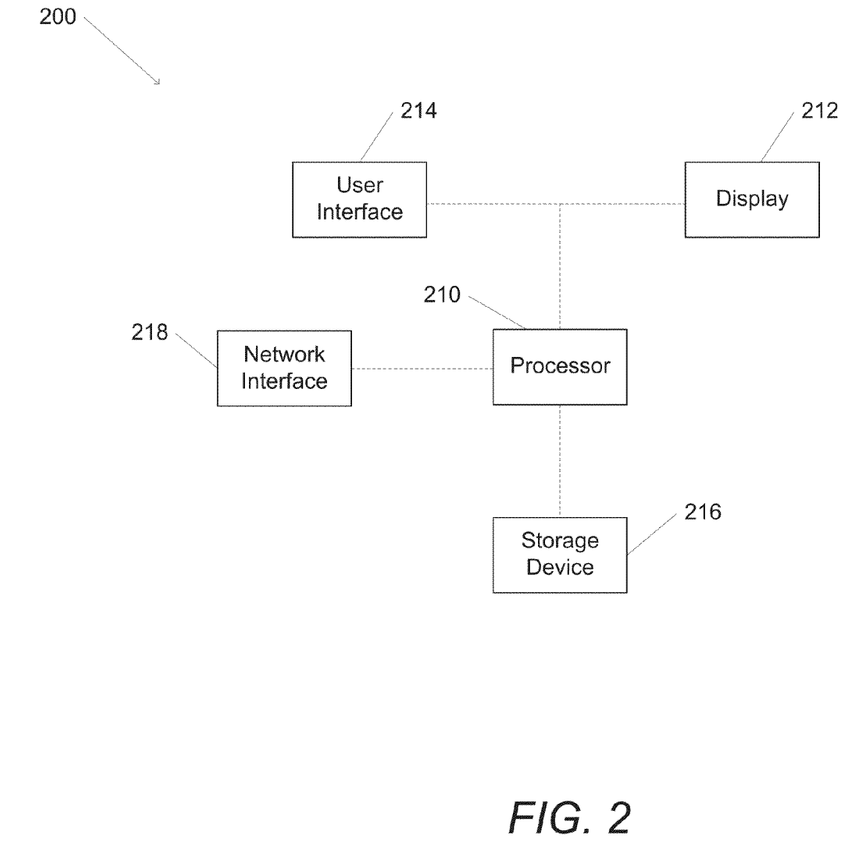
FIG. 2 is a system diagram of a trend detection device in accordance with an embodiment of the invention.

A variety of devices may be configured to detect trends in a stream of words using frequency analysis. Many devices perform a coarse trend detection by analyzing changes in the occurrences of one or more words over discrete periods of time. Additional information can be obtained for use in trend detection by analyzing the frequency components of the sequence of word "counts" (i.e. the sequence of the number of word occurrences in successive discrete time intervals). A diagram of a trend detection device configured to generate signals indicative of the frequency components of a discrete time sequence of word counts and perform trend detection using the frequency component information in accordance with an embodiment of the invention is illustrated in FIG. 2.

The device 200 contains a processor 210 configured to generate one or more signals using words contained in a stream of words. In many embodiments, a signal generated for a word is a signal in the time domain. In a number of embodiments, the signal is a discrete time signal including a sequence of counts of how often the word is mentioned during discrete intervals of time. In several embodiments, a signal generated for a word is a signal in the frequency domain, including information concerning the frequency components of the signal generated for the word in the time domain. In a number of embodiments, the signal indicates the contribution of different portions of the frequency spectrum to the signal generated for the word in the time domain. In many embodiments, a signal is generated by transforming a signal in the time domain into a signal in the frequency domain. In several embodiments, the processor 210 is configured to generate one or more signals from the stream of words using a discrete Fourier transform. In a number of embodiments, the processor 210 is configured to generate 3-dimensional spectrograms using the one or more signals and/or the stream of words. The processor 210 is further configured to determine trending keywords using the one or more signals and to detect trending phrases using the trending keywords. In many embodiments, the processor 210 is configured to analyze a signal to identify normal word usage, new trends, and recurring trends depending on the frequency information present in the signal.

In many embodiments, the processor 210 is configured to store the stream of words, the generated signals, trending keywords, and/or other data using a storage device 216. In a number of embodiments, the stream of words is stored in a database that can also include metadata describing occurrences of individual words including (but not limited to) the time of the occurrence and/or links to other words indicative of a phrase containing the occurrence of the word. In several embodiments, the processor 210 is configured to send and/or receive information, including the stream of words, using a network interface 218. In a number of embodiments, the processor 210 is configured to display information, including the stream of words, generated signals, identified keywords, and/or other data using a display 212. In many embodiments, the processor 212 and the display 212 are connected to a user interface 214 configured to allow interaction with the displayed information. In several embodiments, the user interface 214 enables a user to select one or more keywords and analyze trends related to the one or more keywords.

Although a specific trend detection device is described above, any device capable of generating signals from a stream of words and performing frequency analysis using the generated signals may be used in accordance with embodiments of the invention. Methods for trend detection using frequency analysis with embodiments of the invention are discussed below.

Trend Detection using Frequency Analysis

Figure 3:
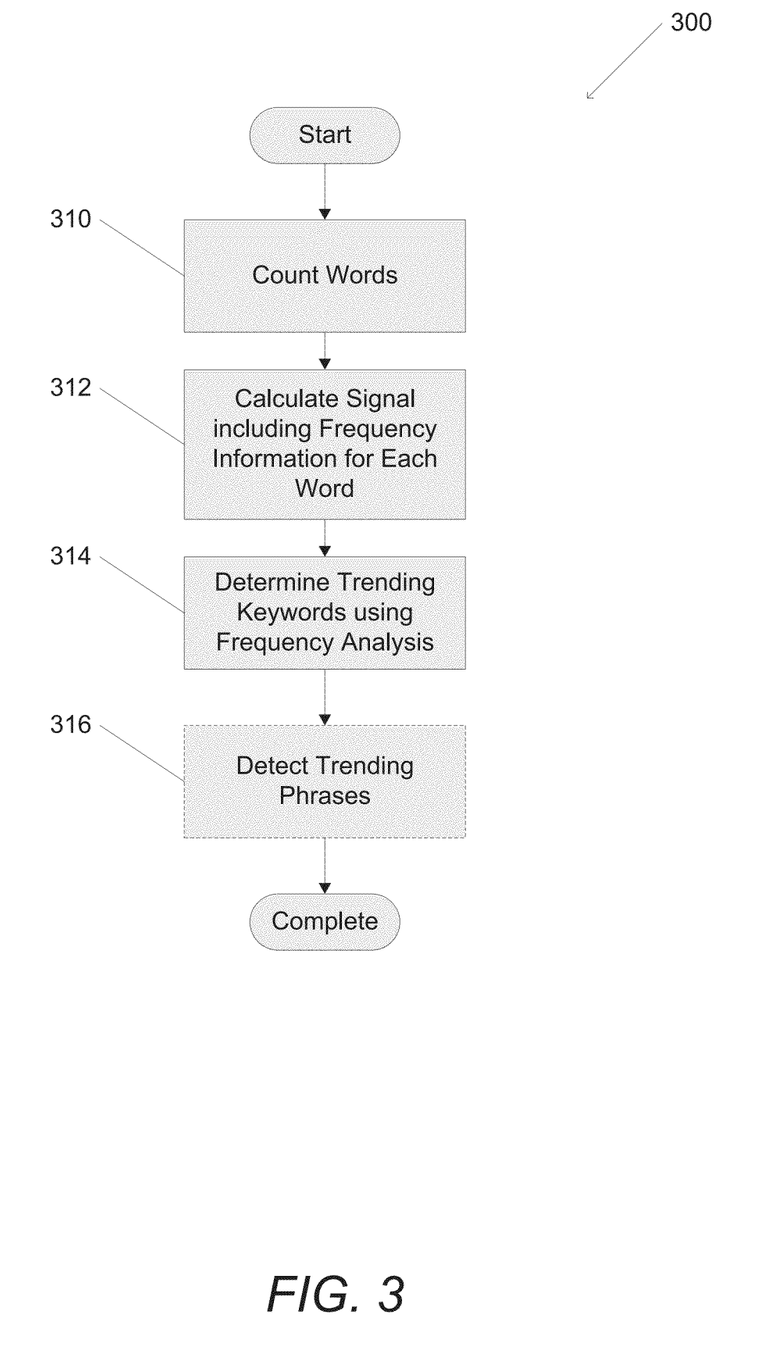
FIG. 3 is a flow chart illustrating a process for performing trend detection using frequency analysis in accordance with an embodiment of the invention.

Trends occurring in a stream of words can be efficiently detected by converting the stream of words into a set of signals and using the generated signals to detect trends. Trend detection devices in accordance with embodiments of the invention are configured to generate signals in the frequency domain and to detect trending keywords based upon the frequency components of the signals. A flow chart illustrating a process for performing trend detection based upon the frequency components of the signals in accordance with an embodiment of the invention is shown in FIG. 3. The process 300 includes counting (310) the number of occurrences of each word in a stream of words during discrete units of time. A signal is calculated (312) for each word that indicates the frequency components of the discrete time sequence of word counts. Trending keywords are determined (314) based upon the frequency components of the calculated (312) signals. In several embodiments, trending phrases are detected (316).

In many embodiments, counting (310) the number of occurrences of each word during discrete time intervals includes filtering out common stop words. In a number of embodiments, the source of the counted (310) words includes headlines and/or articles received from news sources. In several embodiments, the source of the counted (310) words includes messages posted using social networking services, such as Facebook and Twitter. In many embodiments, the source of the counted (310) words includes sources which contain a supplied keyword. In several embodiments, the unit of time is a day. In a number of embodiments, the unit of time is an arbitrary time period.

Calculating Signals with Frequency Information for a Word

In several embodiments, calculating (312) a signal for a word that indicates the frequency components of a discrete time sequence of word counts involves calculating a DFT for that word with respect to the unit of time. A DFT of a word contains frequency information for the word; the frequency information for the word can be analyzed in various frequency ranges. By analyzing the frequency information present across the various frequency ranges in the calculated (312) DFT, a variety of conclusions about the usage of a word may be determined. Three different usages of a word as analyzed using the frequency spectrum calculated (312) for a word in accordance with embodiments of the invention are illustrated in FIGS. 4A, 4B, 5A, 5B, 6A, and 6B.

Examples of Signals Calculated for a Word

Figure 4A:
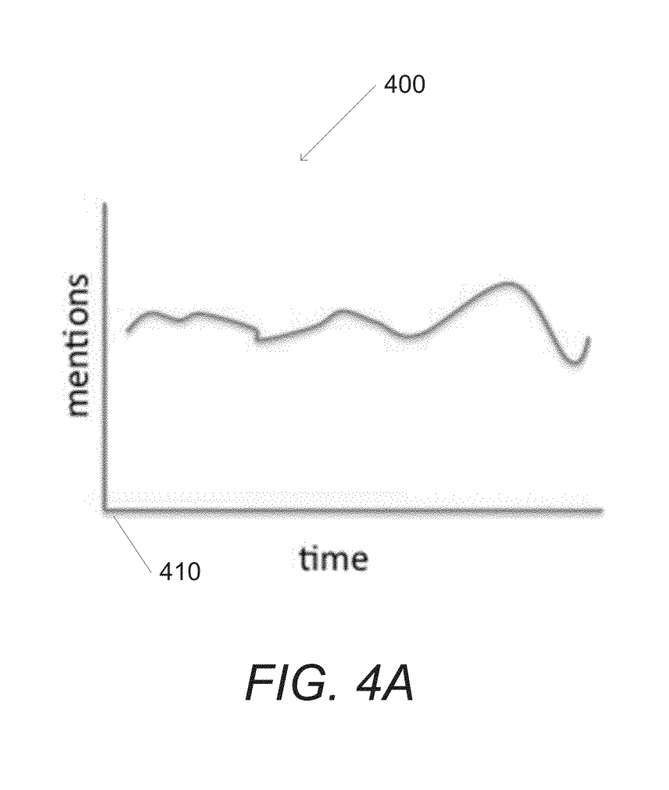
FIG. 4A is a graph that conceptually illustrates the mentions over time of a word used with normal usage in accordance with an embodiment of the invention.
Figure 4B:
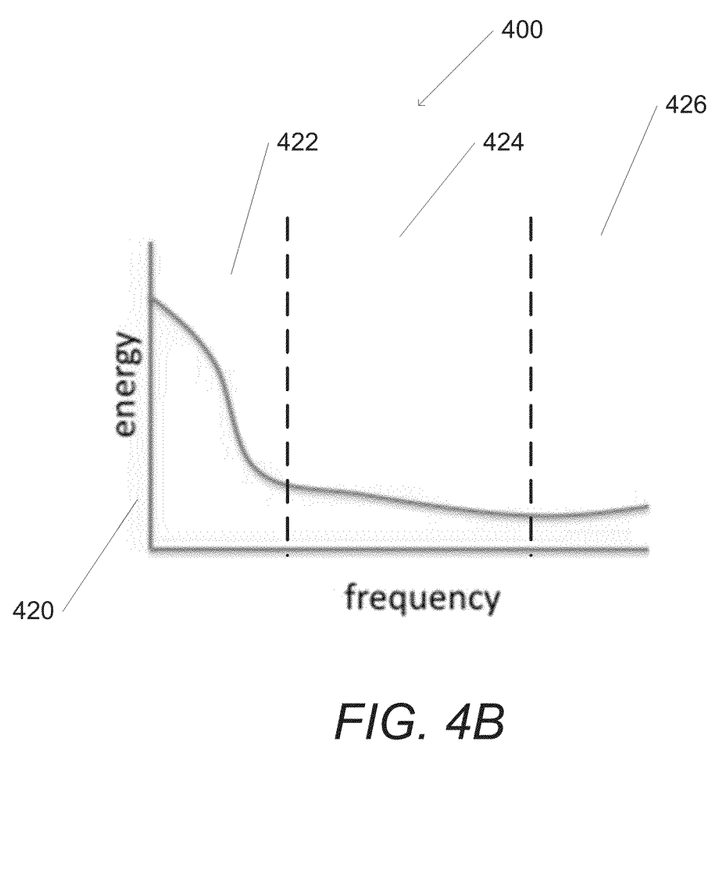
FIG. 4B is a graph that conceptually illustrates the frequency spectrum of a word used with normal usage in accordance with an embodiment of the invention.

An example of a word with normal usage is conceptually illustrated in FIG. 4A. The number of occurrences of a word with respect to time 400 is plotted 410. An example of a signal in the frequency domain generated using a DFT for the word 400 is conceptually illustrated in FIG. 4B. The signal 420 illustrates the frequency components of a discrete time sequence of word counts 400. The signal 420 can be divided into three frequency regions: a low frequency region 422, a medium frequency region 424, and a high frequency region 426. A word 400 that occurs with normal usage shows a high amount of energy in the low frequency region 422 (i.e. strong contributions from frequency components in the low frequency region) and a low amount of energy in the medium frequency region 424 and the high frequency region 426. Most words which fall into normal parts of speech, such as "the" and "I," are examples of a word 400.

Figure 5A:
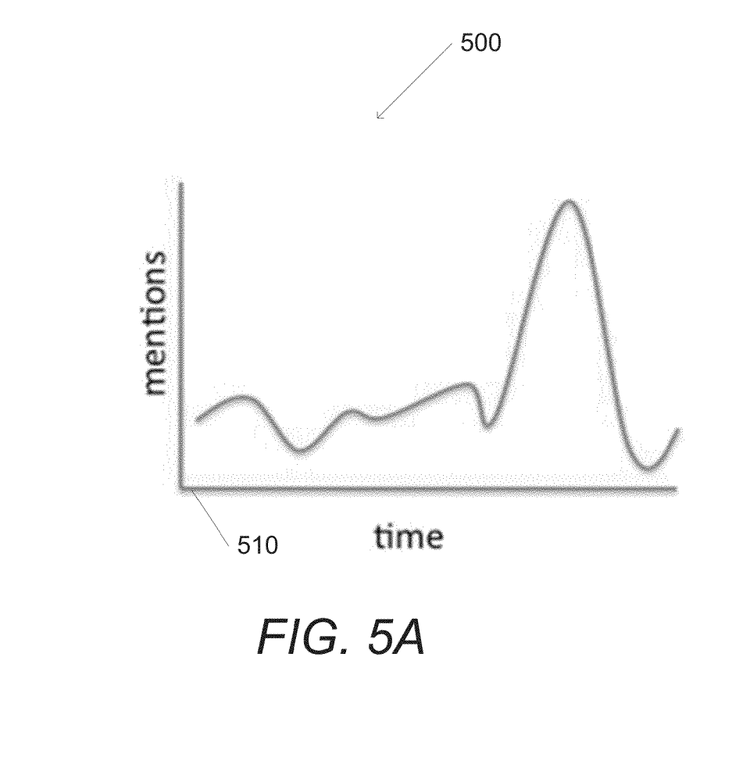
FIG. 5A is a graph that conceptually illustrates the mentions over time of a word used in a new trend in accordance with an embodiment of the invention.
Figure 5B:
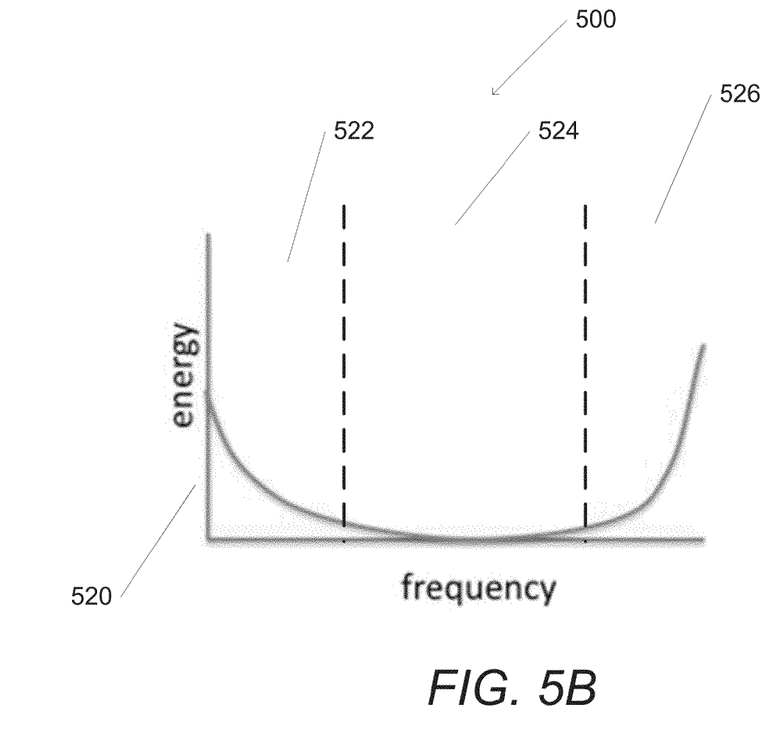
FIG. 5B is a graph that conceptually illustrates the frequency spectrum of a word used in a new trend in accordance with an embodiment of the invention.

An example of a word used in a new trend is conceptually illustrated in FIG. 5A. The number of occurrences of a word 500 with respect to time is plotted 510. An example of a signal in the frequency domain generated using a DFT for the word 500 is conceptually illustrated in FIG. 5B. The signal 520 illustrates the frequency components of a discrete time sequence of word counts 500. The signal 520 can be divided into three frequency regions: a low frequency region 522, a medium frequency region 524, and a high frequency region 526. A word 500 that occurs in a new trend shows a high amount of energy in the low frequency region 522, a low amount of energy in the medium frequency region 524, and a higher amount of energy in the high frequency region 526. This change in the frequency components of the discrete time sequence of word counts 500 indicates a rate of change of the use of the word corresponding to a new trend involving the word 500. Accordingly, trends can be detected by looking for the ratio (and/or sudden changes in the ratio) of high frequency components to low frequency components of the frequency spectrum of a discrete time sequence of word counts.

Figure 6A:
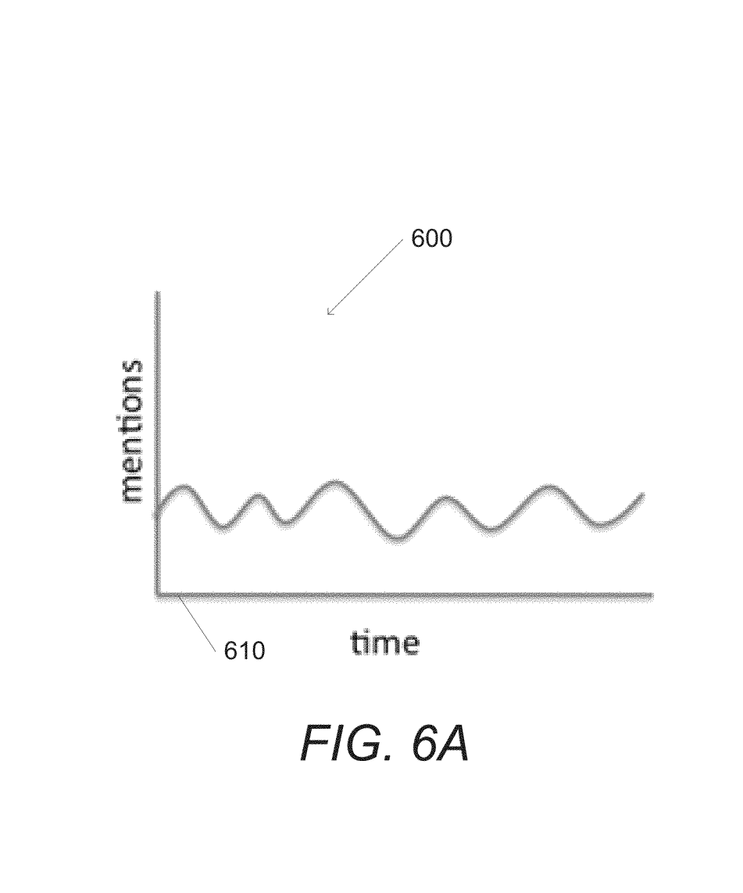
FIG. 6A is a graph that conceptually illustrates the mentions over time of a word used in a recurring trend in accordance with an embodiment of the invention.
Figure 6B:
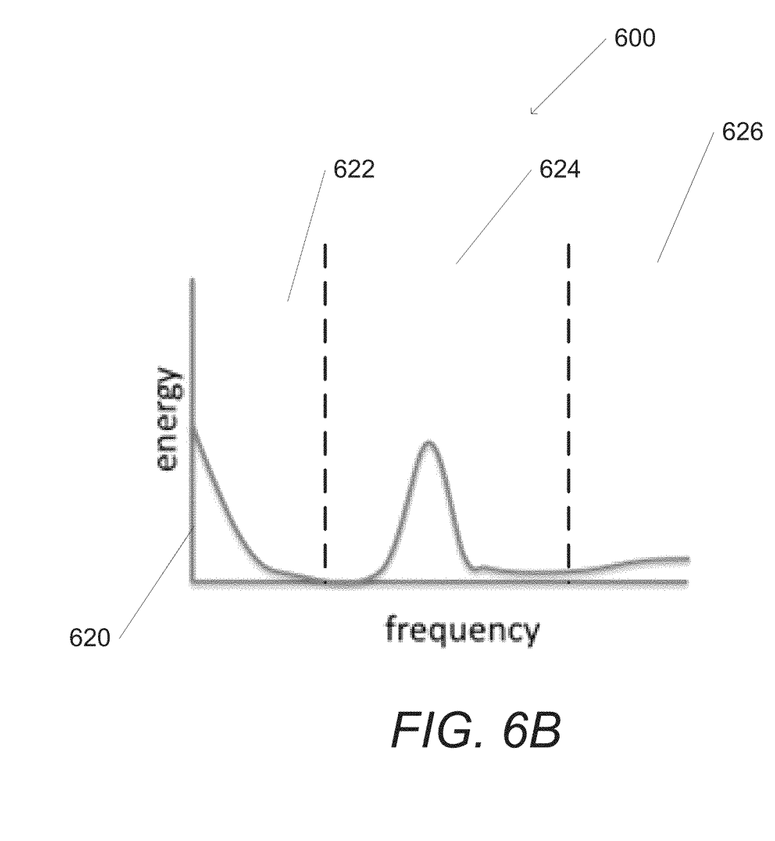
FIG. 6B is a graph that conceptually illustrates the frequency spectrum of a word used in a recurring trend in accordance with an embodiment of the invention.

An example of a word used in a recurring trend is conceptually illustrated in FIG. 6A. The number of occurrences of a word 600 with respect to time is plotted 610. An example of a signal in the frequency domain generated using a DFT for the word 600 is conceptually illustrated in FIG. 6B. The signal 620 illustrates the frequency components of a discrete time sequence of word counts 600. The signal 620 can be divided into three frequency regions: a low frequency region 622, a medium frequency region 624, and a high frequency region 626. A word 600 that occurs in a recurring trend shows a high amount of energy in the low frequency region 622, a medium to high amount of energy in the medium frequency region 624, and a low amount of energy in the high frequency region 626. The presence of energy in the medium frequency region of the frequency spectrum of the discrete time sequence of word counts 600 indicates the word 600 is used in a trend, which reoccurs over time, rather than regularly as a word in normal usage. These reoccurring trends are often not part of any particular source of words; however, the reoccurring trends represent an underlying trend. An example of a reoccurring trend is a meme. Accordingly, recurring trends can be detected based on the ratio of medium frequency components to low frequency components in the frequency spectrum of a discrete time sequence of word counts 600 for a specific word.

Analyzing Words Using Signals with Frequency Information

Once a signal in the frequency domain has been calculated (312) for a word, frequency analysis may be performed using that signal to determine (314) if the word is a trending keyword. In a number of embodiments, the determined (314) trending keywords are words where the contributions of frequencies in the medium and/or high frequency ranges exceed a threshold value. In several embodiments, the determined (314) trending keywords are words with a ratio of high and/or medium frequency components to low frequency components exceeding a threshold value. In many embodiments, the determined (314) trending keywords are those words, which are new trend words and/or recurring trend words. A word can be considered a new trend word if:

$$\frac{\int_{high} F\,df}{\int_{low} F\,df} > T_{new}$$

a word can be considered a recurring trend word if:

$$\frac{\int_{medium} F\,df}{\int_{low} F\,df} > T_{recurring}$$

where F is the calculated (312) signal for a word in the stream of words; low, medium, and high are low, medium and high frequency ranges of F; and $T_{new}$ and $T_{recurring}$ are threshold values to determine if a word is a new trend word or a recurring trend word. In many embodiments, $T_{new}$ and $T_{recurring}$ are pre-determined. In several embodiments, $T_{new}$ and $T_{recurring}$ are dynamically determined based upon a baseline of normal usage of a word. In a number of embodiments, low, medium, high, $T_{new}$, and $T_{recurring}$ are adjusted using a human training feedback loop.

In many embodiments, a 3-dimensional spectrogram is calculated (312) as the signal for a word. In several embodiments, 3-dimensional spectrograms capture both time-varying and frequency-varying information. The various features of the 3-dimensional spectrogram may be utilized to determine (314) trending keywords. For example, a ridge present in a 3-dimensional spectrogram can indicate a sustained trend, whereas a hill or spike can represent a meme or other reoccurring trend. In a number of embodiments, a 3-dimensional spectrogram is calculated (312) using a plurality of DFTs.

Once trending words are determined (314), trending phrases can be detected (316) using the determined (314) trending words in accordance with embodiments of the invention. In a number of embodiments, trending phrases are detected (316) by looking at the words adjacent to a determined (314) trending word in the stream of words, which is the source of the determined (314) trending word. In many embodiments, words adjacent to a trending keyword are words contained in the same sentence, sentence fragment, and/or group of words as the trending keyword. In accordance with embodiments of the invention, words with similar calculated (312) signals tend to be part of similar and/or related trends. In many embodiments, detecting (316) trending phrases includes clustering words with similar calculated (312) signals. The clustered words are used to form the detected (316) trending phrases.

A specific method for performing trend detection using frequency analysis in accordance with an embodiment of the invention is described above; however, a variety of methods, including those methods with generate a signal in the frequency domain using a mathematical transformation which is not a discrete Fourier transform and those methods which utilize different frequency ranges to perform trend detection using frequency analysis, may be utilized in accordance with embodiments of the invention.

Although the present invention has been described in certain specific aspects, many additional modifications and variations would be apparent to those skilled in the art. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for trend detection, comprising:
generating a discrete time sequence of word counts for a target word using a trend detection device;
performing frequency analysis of the discrete time sequence of word counts to determine contributions of frequency components within different frequency ranges, the different frequency ranges comprising a low frequency range, a medium frequency range, and a high frequency range, to the discrete time sequence of word counts using the trend detection device by:
applying a discrete Fourier transform to the discrete time sequence of word counts; and
comparing the contributions of frequency components in the high frequency range of the discrete time sequence of word counts to the contributions of frequency components in the low frequency range of the discrete time sequence of word counts; and
detecting that the target word is a trending keyword based upon at least the frequency analysis of the discrete time sequence of word counts for the target word using the trend detection device.

2. The method of claim 1, wherein comparing the contributions of frequency components in the high frequency range of the discrete time sequence of word counts to the contributions of frequency components in the low frequency range of the discrete time sequence of word counts comprises comparing the ratio of energy of the frequency components in the high frequency and low frequency ranges to a first threshold value.

3. The method of claim 2, wherein the first threshold is determined based upon a ratio of energy determined using a discrete time sequence of word counts for normal usage of the target word.

4. The method of claim 2, wherein the first threshold is adjusted using a human training feedback loop.

5. The method of claim 1, wherein performing frequency analysis further comprises comparing the contributions of frequency components in the middle frequency range of the discrete time sequence of word counts to the contributions of frequency components in the low frequency range of the discrete time sequence of word counts.

6. The method of claim 1, wherein performing frequency analysis further comprises comparing the contributions of frequency components in the middle frequency range of the discrete time sequence of word counts to the contributions of frequency components in the low frequency range of the discrete time sequence of word counts further comprises comparing the ratio of energy of the frequency components in the medium and low frequency ranges to a second threshold value.

7. The method of claim 1, further comprising receiving a set of words including a plurality of occurrences of the target word using the trend detection device.

8. The method of claim 7, wherein the set of words is a stream of words.

9. The method of claim 7, further comprising assigning a time stamp to at least one occurrence of target word in the set of words using the trend detection device.

10. The method of claim 7, further comprising discarding stop words from the set of words using the trend detection device.

11. The method of claim 7, further comprising storing the set of words in a database, where the database associates metadata including a time with each occurrence of the target word.

12. The method of claim 11, wherein generating a discrete time sequence of word counts for the target word using a trend detection device comprises using the time associated with each occurrence of the target word to determine the number of occurrences of the target word during discrete time intervals.

13. The method of claim 1, further comprising detecting a trending phrase including the target word using the trend detection device, when the trend detection device detects that the target word is a trending keyword.

14. The method of claim 13, wherein detecting trending phrases further comprises clustering the target keyword with at least one additional trending keyword using the trend detection device.

15. The method of claim 13, further comprising:
receiving a set of words including a plurality of occurrences of the target word using the trend detection device, where the set of words includes groups of words and at least one group of words includes the target word;
wherein detecting a trending phrase further comprises adding at least one additional word to the target word to create a target phrase, where the at least one additional word is in a group of words that includes the target word.

16. The method of claim 1, wherein performing frequency analysis comprises generating a 3-dimensional spectrogram using the discrete time sequence of word counts.

17. The method of claim 1, further comprising targeting advertising based on at least one keyword including at least the target word using an advertising targeting server system, when the trend detection device detects that the target word is a trending keyword.

18. A trend detection device, comprising:
    word data storage storing a stream of words;
    application storage storing a trend detection application; and
    a processor;
    wherein the trend detection application configures directs the processor to:
        generate a discrete time sequence of word counts for a target word;
        perform frequency analysis of a discrete time sequence of word counts to determine contributions of frequency components within different frequency ranges, the different frequency ranges comprising a low frequency range, a medium frequency range, and a high frequency range, to the discrete time sequence of word counts by:
            applying a discrete Fourier transform to the discrete time sequence of word counts; and
            comparing the contributions of frequency components in the high frequency range of the discrete time sequence of word counts to the contributions of frequency components in the low frequency range of the discrete time sequence of word counts; and
        detect that a target word is a trending keyword based upon at least the frequency analysis of a discrete time sequence of word counts for the target word.

19. The trend detection device of claim 18, wherein the trend detection application further directs the processor to detect a trending phrase including a target word.

\* \* \* \* \*

UNITED STATES PATENT AND TRADEMARK OFFICE
CERTIFICATE OF CORRECTION

PATENT NO. : 9,002,892 B2
APPLICATION NO. : 13/568851
DATED : April 7, 2015
INVENTOR(S) : Daniel Benyamin It is certified that error appears in the above-identified patent and that said Letters Patent is hereby corrected as shown below:

In The Claims

In claim 18, sixth line (at Column 11, line 14) after application delete "configures"

Signed and Sealed this
Twenty-eighth Day of July, 2015

Michelle K. Lee
*Director of the United States Patent and Trademark Office*